US007149688B2

(12) United States Patent
Schalkwyk

(10) Patent No.: US 7,149,688 B2
(45) Date of Patent: Dec. 12, 2006

(54) MULTI-LINGUAL SPEECH RECOGNITION WITH CROSS-LANGUAGE CONTEXT MODELING

(75) Inventor: Johan Schalkwyk, Somerville, MA (US)

(73) Assignee: SpeechWorks International, Inc., Boston, MA (US)

( * ) Notice: Subject to any disclaimer, the term of this patent is extended or adjusted under 35 U.S.C. 154(b) by 807 days.

(21) Appl. No.: 10/287,438

(22) Filed: Nov. 4, 2002

(65) Prior Publication Data

US 2004/0088163 A1 May 6, 2004

(51) Int. Cl.
G10L 15/00 (2006.01)
(52) U.S. Cl. ...................... 704/255; 704/277
(58) Field of Classification Search ............... None
See application file for complete search history.

(56) References Cited

U.S. PATENT DOCUMENTS

| | | | |
|---|---|---|---|
| 4,980,918 A | | 12/1990 | Bahl et al. |
| 5,241,619 A | | 8/1993 | Schwartz et al. |
| 5,510,981 A | * | 4/1996 | Berger et al. .................. 704/2 |
| 5,581,655 A | | 12/1996 | Gohen et al. |
| 5,797,122 A | | 8/1998 | Spies |
| 5,930,746 A | * | 7/1999 | Ting .............................. 704/9 |
| 5,991,720 A | | 11/1999 | Galler et al. |
| 5,995,931 A | | 11/1999 | Bahl et al. |
| 6,078,886 A | | 6/2000 | Dragosh et al. |
| 6,085,160 A | * | 7/2000 | D'hoore et al. .......... 704/256.2 |
| 6,088,669 A | | 7/2000 | Maes |
| 6,278,973 B1 | | 8/2001 | Chung et al. |
| 6,304,841 B1 | * | 10/2001 | Berger et al. .................. 704/2 |
| 6,389,395 B1 | | 5/2002 | Rignland |
| 6,430,551 B1 | | 8/2002 | Thelen et al. |
| 6,438,520 B1 | | 8/2002 | Curt et al. |
| 6,912,499 B1 | * | 6/2005 | Sabourin et al. ............ 704/255 |
| 2003/0009335 A1 | | 1/2003 | Schalkwyk et al. |

FOREIGN PATENT DOCUMENTS

| | | |
|---|---|---|
| WO | 01/26092 | 4/2001 |
| WO | 01/91107 | 11/2001 |
| WO | 02/27535 | 4/2002 |

OTHER PUBLICATIONS

Kanthak et al., "Multilingual Acoustic Modeling Using Graphemes", *Proc. European Conference on Speech Communication and Technology*, 2: 1145-1148 (2003).
Schultz et al., "Experiments on Cross-Language Acoustic Modeling", *Eurospeech 2001—Scandinavia*, 4:2721 (2001).
Ward et al., "Towards Speech Understanding Across Multiple Languages", *1998 International Conference on Spoken Language Processing*, ICSLP98, Nov. 30, 1998, p. F400.
Andrej et al., "Crosslingual Speech Recognition with Multilingual Acoustic Models Based on Agglomerative and Tree-Based Triphone Clustering", *Eurospeech 2001—7TH European Conference on Speech Communication and Technology*, 4:2725 (2001).

(Continued)

*Primary Examiner*—David D. Knepper
(74) *Attorney, Agent, or Firm*—Fish & Richardson P.C.

(57) ABSTRACT

An approach to multi-lingual speech recognition that permits different words in an utterance to be from different languages. Words from different languages are represented using different sets of sub-word units that are each associate with the corresponding language. Despite the use of different sets of sub-word units, the approach enables use of cross-word context at boundaries between words from different languages (cross-language context) to select appropriate variants of the sub-word units to match the context.

26 Claims, 7 Drawing Sheets

OTHER PUBLICATIONS

Sixtus Achim et al., "From within-word model search to across-word model search in large vocabulary continuous speech recognition", *Computer Speech and Language*, 16(2):245-271 (2002).

Zhirong Wang et al., "Towards Universal Speech Recognition", *Proceedings Fourth IEEE International Conference on Multimodal Interfaces*, pp. 247-252 (Oct. 14, 2002).

Dupont, "Dynamic Use of Syntactical Knowledge in Continuous Speech Recognition", 3rd European Conference on Speech Communication and Technology, Berlin, pp. 1959-1962, 1993.

Mohri, "Finite-State Transducers in Language and Speech Processing", Association For Computational Linguistics, vol. 23, 1997, pp. 1-42.

Mohri et al., "Integrated Context-Dependent Networks in Very Large Vocabulary Speech Recognition", AT&T Labs—Research, USA, 1999.

Mohri, "Weighted Grammar Tools: The GRM Library", Robustness In Language And Speech Technology, Kluwer Academic Publishers, Ch. 2, pp. 19-40, 2000.

Mohri, "On Some Applications of Finite-State Automata Theory to Natural Language Processing", Natural Language Engineering 1 (1): 000-000, Cambridge University Press, 1995.

Mohri, "On Some Applications of Finite-State Automata Theory to Natural Language Processing", Universite Marne-la-Vallee, May 9, 1995.

Mohri et al., "Full Expansion of Context-Dependent Networks in Large Vocabulary Speech Recognition", AT&T Labs—Research, USA.

Pereira et al., "Weighted Rational Transductions and their Application to Human Language Processing", AT&T Bell Laboratories.

Riley et al., "Transducer Composition for Context-Dependent Network Expansion", AT&T Labs—Research, USA, Jul. 2, 1997.

Krieger et al., "Efficient Parameterizable Type Expansion for Typed Feature Formalisms", German Research Center for Artificial Intelligence (DFKI), Germany, 1995.

Simmons et al., "The Acquisition and Application of Context Sensitive Grammar for English", Department of Computer Sciences, AI Lab, University of Texas, USA, 1991.

Brown et al., "Context-Free Large-Vocabulary Connected Speech Recognition With Evolutional Grammars", 1994 IEEE, pp. II-145-II-148.

Boulianne et al., "French Large Vocabulary Recognition With Cross-Word Phonology Transducers", 2000 IEEE, pp. 1675-1678.

Gawron et al., "Processing English With A Generalized Phase Structure Grammar", ACL Proceedings, 1982, pp. 74-81.

Demuynck et al., "An efficient search space representation for large vocabulary continuous speech recognition", Speech Communication, vol. 30, No. 1, p. 37-53, XP004363634, (Jan. 2000).

NUANCE: "Nuance Speech Recognition System, Version 8.0, Grammar Developer's Guide", Nuance Communication Inc., XP001117344 (2001).

Wang, et al., "Unified context-free grammar and n-gram model for spoken language processing", IEEE, vol. 3 of 6, p. 1639-1642, XP002181416, (2000).

Notification of Transmittal of the International Search Report or the Declaration and International Search Report for corresponding PCT Application PCT/US03/35010 dated Jun. 7, 2004.

Notification of Transmittal of International Preliminary Examination Report for corresponding PCT Application PCT/US03/35010 dated Aug. 30, 2004.

* cited by examiner

MULTI-LINGUAL SPEECH RECOGNITION WITH CROSS-LANGUAGE CONTEXT MODELING

CROSS-REFERENCE TO RELATED APPLICATIONS

This application is related to U.S. application Ser. No. 09/906,390, "Speech Recognition with Dynamic Grammars," filed on Jul. 16, 2001, and to U.S. application Ser. No. 09/906,575, "Grammars for Speech Recognition," filed on Jul. 16, 2001. Both these applications are incorporated herein by reference.

BACKGROUND

This invention relates to multi-lingual speech recognition with context modeling.

Speech recognition systems have been developed to recognize words and longer utterances in a number of languages. Many current speech recognizers make use of phonetic sub-word units to represent of words, and statistical parameters that are associated with those sub-word units are estimated from training speech. Speech recognizers that are tailored for particular languages typically make use of an underlying set of sub-word units that are most appropriate to that language. These sets of sub-word units often differ significantly from one language to another. For example, a set of phonetic units that would typically be used for English can be very different than a set of syllable-based units that may be used for Chinese. Not only are the units different, the distinctions between different units may be based on features unique to the language. For example, Chinese units may differ according to their "tone" (a function of the pitch contour) while English units would not typically address differences in tone.

One problem that has been addressed is the transfer of statistical information obtained from data in one language to enable or improve speech recognition in another language. For example, it may be desirable to use to training data from one language to configure a speech recognizer in another language. However, in general, speech recognizers that are developed for different languages typically use different sets of sub-word units, which are appropriate for that language. One solution to this problem that has been proposed is to train speech recognizers using a universal set of subword units. For example, multi-lingual speech recognizers have been developed in which words of all the supported languages are represented in the International Phonetic Alphabet (IPA), or one of a number of similar multi-language sets of subword units (e.g., WorldBet, SAMPA).

In both single-language and multi-language speech recognition, an important technique for improving accuracy of speech recognizers is to use context-dependent subword units. Statistical parameters for a context-dependent subword unit are based on the context of adjacent units in a word, and at word boundaries adjacent units in adjacent words (cross-word context). One approach to selection of context-dependent units is to use a decision tree to identify variants of a unit that depend on the adjacent context. In general, the decision tree uses the identities or characteristics of the adjacent units to select the appropriate context-dependent variant.

SUMMARY

In a general aspect, the invention features an approach to multi-lingual speech recognition that permits different words in an utterance to be from different languages. Words from different languages are represented using different sets of sub-word units that are each associate with the corresponding language. Despite the use of different sets of sub-word units, the approach enables use of cross-word context at boundaries between words from different languages (cross-language context) to select appropriate variants of the sub-word units to match the context.

In one aspect, in general, the invention features a method for selecting context-dependent units for speech recognition. A first word from a first language is represented in terms of subword units from a first set of subword units that is associated with the first language. A first subword unit of the first word is adjacent to the second word from a second language according to a speech recognition grammar. A common set of features characterize subword units in both the first set of subword units and in a second set of subword units that is associated with the second language. One or more first context-dependent units corresponding to the first subword unit are selected according to features in the common set of features of a second subword unit of the second word which is adjacent to the first word according to the grammar.

Aspects of the invention can include one or more of the following features.

The first set of subword units, the second set of subword units, or both, each includes phonetic subword units.

The first language includes English.

The first word precedes the second word in the speech recognition grammar or the first word follows the second word in the speech recognition grammar.

Selecting one or more first context-dependent units corresponding to the first subword unit includes selecting only a single context dependent unit.

The second word is a specific word in the second language, and selecting the one or more context-dependent units includes selecting said units according to a specific subword unit of the specific word which is adjacent to the first word according to the speech recognition grammar.

The method includes selecting one or more second context-dependent units associated with the second subword unit according to features in the common set of features of a first subword unit of the first word which is adjacent to the first word according to the speech recognition grammar.

The method includes linking the selected one or more first context-dependent units to the selected one or more second context dependent units to form a context-dependent grammar.

The second word is an unspecified word in the second language, and selecting the one or more context-dependent units includes selecting said units according to multiple possible second words of the second language.

The method includes forming a grammar enabling runtime linking of the selected one or more first context-dependent units with a later-determined second subword unit.

The method includes determining an identity of the second subword unit after forming the grammar enabling runtime linking.

The method includes selecting a subset of the one or more of the first context-dependent units at runtime based on the determined identity of the second subword unit.

The method includes accepting first statistical data for selecting context-dependent units associated with the first set of subword units according to context of said units, and selecting the one or more context-dependent units includes using the accepted statistical data.

The first statistical data is computed using only training data from the first language.

The first statistical data enables selection of a unique context-dependent subword unit associated with a subword unit and a context of subword units all from the first set of subword units associated with the first language.

Selecting the one or more first context-dependent units associated with the first subword unit includes selecting said units that are not inconsistent with a context of subword units that includes subword units from both the first and the second set of subword units.

The statistical data includes one or more decision trees.

The decision tree is used to identify one or more leaves of said tree associated with said context-dependent units.

Branches of the tree are selected according to features of the second subword unit in the common set of features.

Branches of the tree are selected without consideration of features of the second subword unit not in the common set of features.

Aspects of the invention can include one or more of the following advantages:

Allowing a speech recognizer to accept utterances with mixed languages supports situations such as use of a name from a first language in an utterance in a second language without requiring phonetic representation of the name in the units of the second language.

Sub-word units for each language can be selected independent to provide the best speech recognition accuracy in that language. For example, use of an universal set of units such as the International Phonetic Alphabet (IPA) may provide inferior performance to separately selecting units tailored to each target language.

Because the units for each language can be selected independently, new languages, each of which may have its own set of subword units, can be added after parameter estimation (training) for the existing languages is completed.

Trained speech recognizers can packaged and sold separately for each of a number of languages, and combined without restriction to which subsets of languages can coexist.

Other features and advantages of the invention are apparent from the following description, and from the claims.

DESCRIPTION OF DRAWINGS

FIG. 2A is a portion of a graph with arcs labeled with sub-word units; FIG. 2B is a decision tree used to select context-dependent units; FIG. 2C is a portion of a graph with arcs labeled with context-dependent subword units;

FIG. 3A is a portion of a graph with arcs labeled with sub-word units; FIG. 3B is a decision tree used to select context-dependent units; FIG. 3C is a portion of a graph with arcs labeled with context-dependent subword units;

FIG. 5A illustrates a portion of a main grammar and a portion of a dynamic grammar; FIG. 5B illustrates expansion into subword units; FIG. 5C illustrates edges with possible context-dependent units; FIG. 5D illustrates that context-dependent graph after dynamic combination;

FIG. 6A is a portion of a grammar; FIG. 6B is a combine lexicon FST; FIG. 6C is a portion of a context-independent phonetic FST.

DESCRIPTION

1 System Overview

Figure 1:
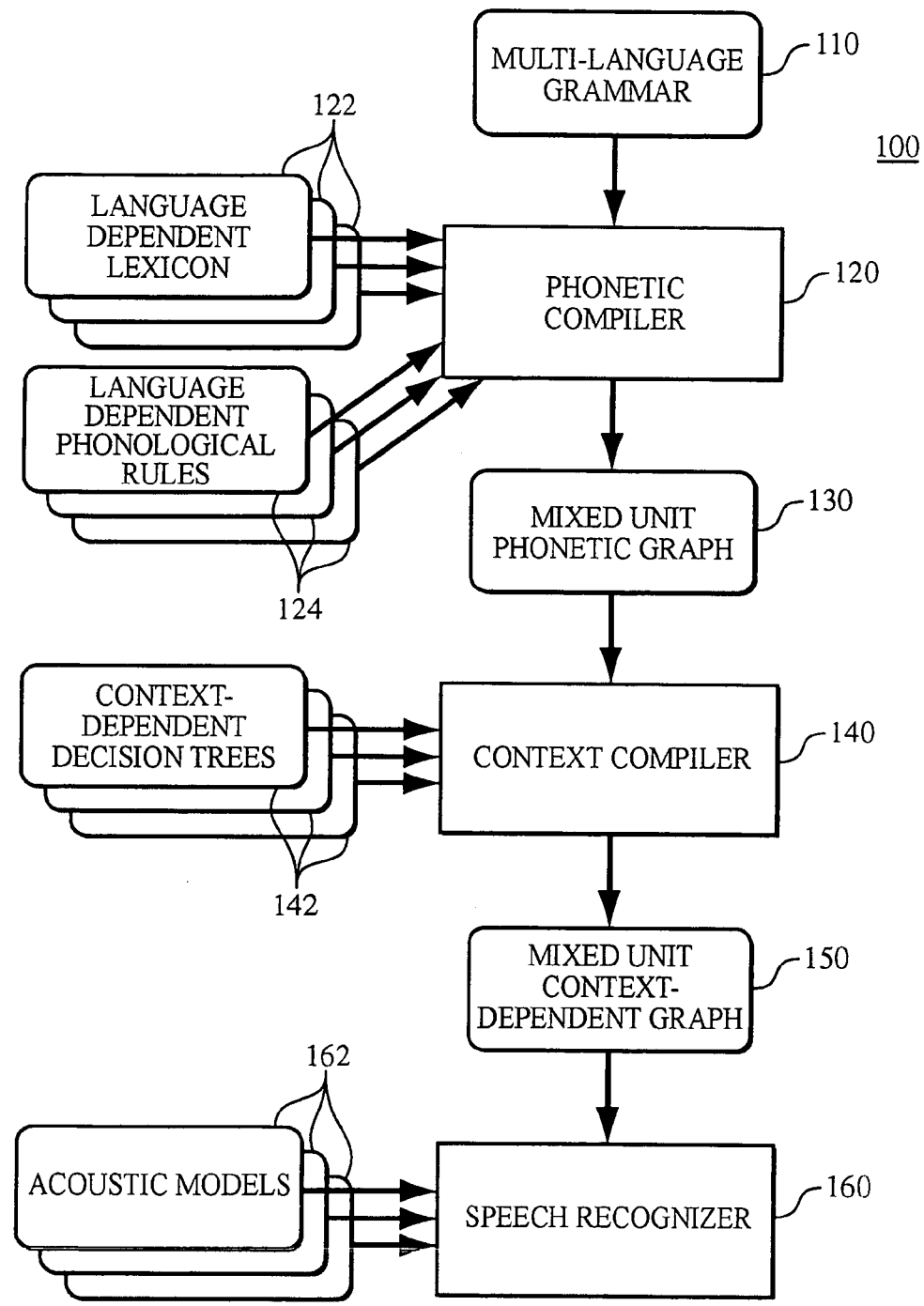
FIG. 1 is a block diagram of a speech recognition system.

Referring to FIG. 1, a speech recognition system 100 uses a multi-language grammar 110 to specify word sequences that a runtime speech recognizer 160 can interpret in input speech utterances. A multi-language grammar 110 allows different words or phrases to be specified as belonging to different languages. An example of a multi-lingual grammar allows utterances to contain a Chinese translation of "What is the price of _____ shares" where the blank is an (un-translated) English name of a company.

A phonetic compiler 120 accepts multi-language grammar 110, and uses a separate language dependent lexicon 122 and separate language dependent phonological rules 124 for each language to translate the multi-language grammar into a mixed unit phonetic graph 130. Lexicon 122 for each language specifies a mapping from words in that language into one or more sequences of subword units for each word representing the one or more pronunciations of the word.

The set of subword units used for one language does not have to be the same as those units used for another language, and the sets may be total disjoint. As an example, an English lexicon 122 may map words into sequences on English phones, while a Chinese lexicon may map words into sequences of syllables or sequences of half-syllables (initial and final portions of syllables). Grammar 110 is represented as a graph in which arcs are labeled with words. Phonetic compiler 120 uses lexicons 122 to expand arcs of the grammar to represent the corresponding sequences of sub-word units, generally resulting in word arcs being expanded into subgraphs that accept the corresponding sequences of subword units. A discussion of an efficient implementation of these and other graph transformations using Finite State Transducers (FSTs) is deferred to later in this description.

Each language optionally has language-dependent phonological rules that are used to modify the portion of an expanded graph that corresponds to words in that language. For English, these rules are used to transform a graph with arcs labeled with phones to a graph labeled with phonemes. For example, such rules may take into account cross-word co-articulation in mapping phones to phone sequence.

The result of application of the lexicons and phonological rules for the languages is mixed unit phonetic graph 130, which has arc that are labeled with subword units (e.g., phonemes) from one or more of the languages used in the grammar.

A context compiler 140 accepts phonetic graph 130 and produces a mixed-unit context-dependent graph 150, in which one or more arcs labeled with context-dependent units correspond to each arcs in phonetic graph 130 that is labeled with a context-dependent subword unit. A speech recognizer 160 uses this context-dependent graph, as well as acoustic models 162 for each of the languages, to convert input speech utterances to word sequence, where different words in the output word sequences may come from different languages.

2 Context-Dependent Models

Context compiler 140 accepts phonetic graph 130 and produces a corresponding context-dependent graph 150. As introduced above, phonetic graph 130 is labeled with subword units, such as phonemes, while context-dependent graph 150 is labeled with context-dependent subword units, such as context-dependent phonemes.

Figure 2A:
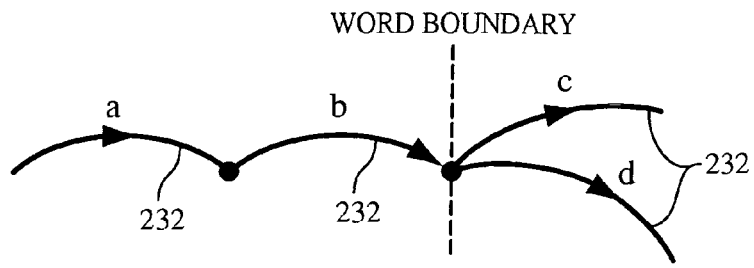
FIGS. 2A–2C illustrate selection of context-dependent units using a decision tree.
Figure 2B:
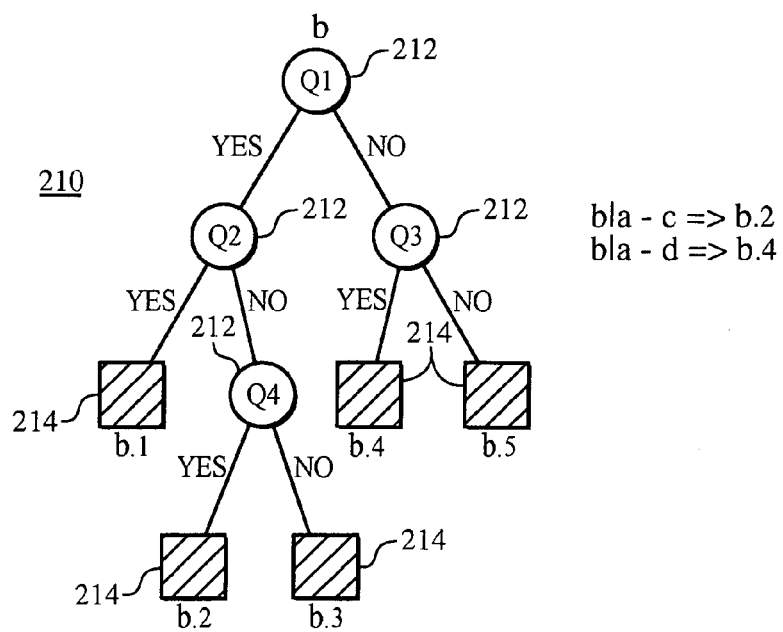
Figure 2C:
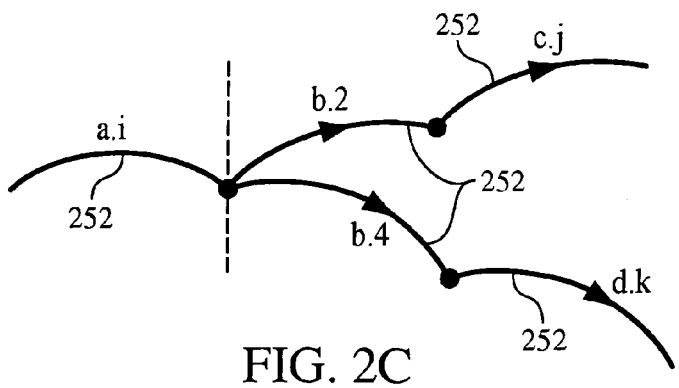

The procedure carried out by context compiler 140, when applied to subword units of a single language is illustrated in FIGS. 2A–2C. Referring to FIGS. 2A, an example of a portion of a phonetic graph 130 includes a series of arcs 232, each labeled with a subword unit, for illustration labeled here as "a", "b", and "c".

Each subword unit in a language is associate with a number, typically greater than one, of context-dependent subword units. Each of these context-dependent units is associated with somewhat different statistical parameters in acoustic model 162 for that language that characterize the variations in the acoustic realization of the unit depending on the context. For example, the subword unit "b" may be associated with five context-dependent variants, labeled "b.1" through "b.5", each corresponding to different statistical parameters. In FIG. 2A, the unit "b" is found in the context of an "a" preceding it and either a "c" or a "d" following it. The notation "b|a_c" is used to denote the unit "b" in the preceding (left) context "a" and in the following (right) context "c".

Context compiler 140 transforms phonetic graph 130 into context-dependent graph 150 by modifying labels on arc of the phonetic graph and also modifying the structure of the phonetic graph to accommodate different contexts. For example, if the unit "b|a_c" is associated with a different context-dependent unit than "b|a_d", then the single arc of the phonetic graph labeled with "b" corresponds to multiple arcs in the context-dependent graph. In this example, "b|a_c" is associated with "b.2" and "b|a_d" is associated with "b.4". FIG. 2C shows a portion of the expanded context-dependent graph 150, in which arcs are labeled with context-dependent units.

Context compiler 140 makes use of data that specifies a mapping from each combination of a subword unit and its context to a context-dependent variant of that subword unit that depends on the context. In this embodiment, a binary decision trees are used to implement the mapping, with one tree being associated with each subword unit (i.e., with each possible subword unit label on an arc in phoneme graph 130). Each questions at each node in a decision tree can be answered based on the context for that subword unit. As illustrated in FIG. 2B, the decision tree for "b" includes a number of nodes 212, each associated with a question, and a number of leaves 214, each associated with a different context-dependent variant. At each node 212, application of the associated question to the context determines whether the left or the right branch is taken. For a particular context, the decision tree deterministically yields a single leaf 214 based on the context. For example for the context decision tree for the unit "b" shown in FIG. 2B, the context "a_c" may result in a "yes" answer to question Q1 and a "no" to question Q4 yielding variant "b.2", while the context "a_d" may result in a "no" to question Q1 and a "yes" to question Q3 yielding variant "b.4".

Each subword unit is associated with a number of features, for example, acoustic-phonetic features. Examples of such features include "vowel", "front", "back", "consonant", "fricative", "nasal", "tone", etc. Features are typically binary-valued, for example true/false or present/absent, although some features may be multiply-valued, for example, for the different types of "tone" in a Chinese syllable. For some or all language, various of the features can imply others. For example, in English, "fricative" implies "consonant" although the same is not necessarily true in all languages. Questions at nodes 212 in the decision trees are Boolean expressions based on the features of the subword units in the preceding or following context (or both). For example, question Q1 may be "Is the subword unit in the right context voiced?". Questions at the nodes of the decision tree can be simple and depend on the value of a single feature of a single contextual subword unit, or can be more complex depending on the values of multiple features form multiple contextual units.

The features of the subword units for each language can be partitioned into a set of language-independent features, which is common to all languages, and a set of language-dependent features. For example, for Chinese, the feature "tone" would generally be treated as a language-dependent feature while "voiced" would be a language-independent feature. An example of an English language-dependent features is "version of 'r'".

During a training phase of the speech recognition system for a-particular language, context decision trees are constructed for each of the subword units of that language using training data that includes spoken utterances and transcriptions of those utterances in the language being trained. A number of different well-known training techniques for construction of the decision trees can be used, for example, that use statistical characteristics of speech data in different context to best determine which questions should be associated with each node in the tree and to determine the number of leaves of the overall tree.

In this embodiment of the system, questions at nodes test the value of a single feature of either the left or the right contextual subword unit. Questions at nodes can also test the value of a feature of the context-independent subword unit itself in situations in which multiple such units share a common decision tree.

Note that in alternative versions of the system, the relevant context for selection of context-dependent variants of a subword unit is not limited to directly adjacent units. Also, certain questions in the decision tree may be based on other characteristics of the than the features of the contextual subword units. Furthermore, although decision trees are used in this embodiment to map a context to a specific context-dependent variant of the subword unit associated with the context, other mapping approaches can be used with little or no modification of the overall multi-language approach.

3 Cross-Language Context Modeling

Figure 3A:
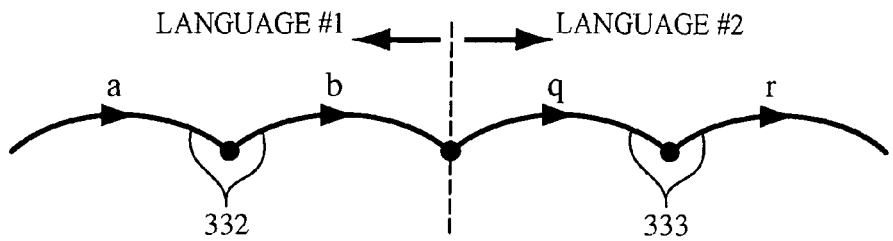
FIGS. 3A-3C illustrate selection of context-dependent units using a decision tree at language transitions.

In situations in which multi-language grammar 110 contains words from multiple languages, phonetic graph 130 will in general include arcs labeled with subword units from different languages. Referring to FIG. 3A, a sample portion of mixed unit phonetic graph 130 includes arcs 332 labeled with subword units "a" and "b" from a first language, which are adjacent to arcs 333 labeled with subword units "q" and "r" from a second language. The node linking "b" and "q" corresponds to a language transition from the first language to the second language.

Figure 3B:
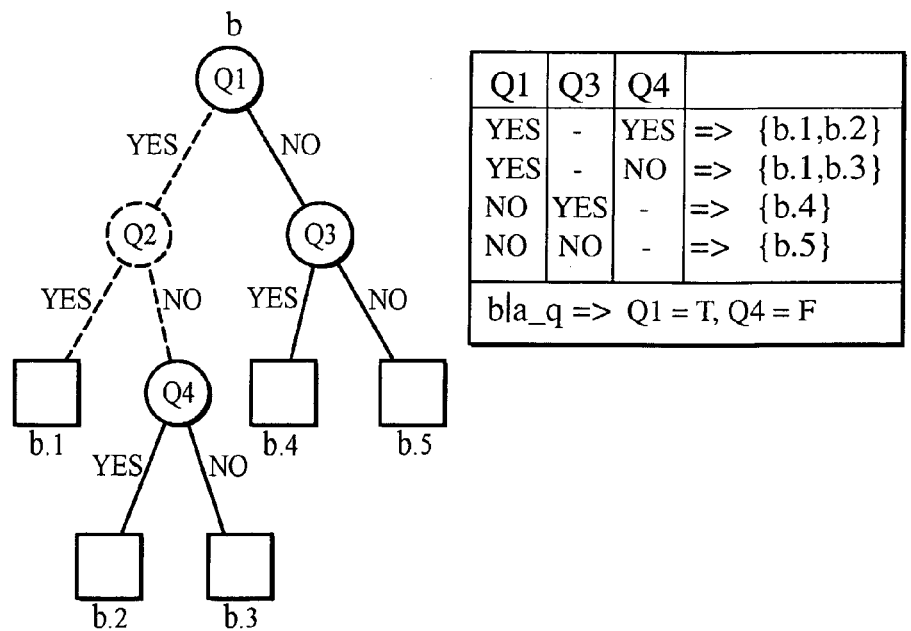

Referring to FIG. 3B, a context decision tree for unit "b" is as in FIG. 2. This tree is constructed using training data from the first language, with which the unit "b" is associated. In the illustrated case, the unit "b" has a left context "a" from the same language it is "b", while its right context "q" is from a different language. As noted above, the unit "q" is characterized by values of a number of features, some of which come from a language in-dependent set while others come from a set of features that are not common to all languages, for example, being unique to the second language. The context decision tree for "b" therefore can include questions are based on values of both language-independent features in the context as well as features in the set for the first language. The consequence is that certain of the questions in the "b" tree may depend on a first language features of the right context. However, such a question cannot be answered is the right context from the second language does not have values of those features. For example, if the first language is Chinese and the second language is English, then if question Q2 depends on the "tone" of the right context, this question cannot be answered if the subword unit "q" does not have a value for the feature "tone."

Figure 3C:
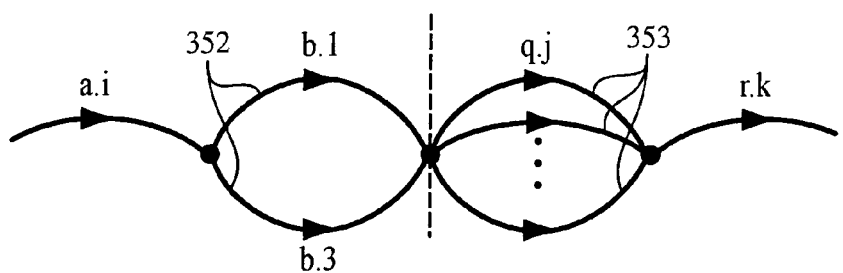

The approach taken to deal with questions that cannot be answered is to consider only the questions for which the required features of the context are known. In this example, assume that for the context "a_q" the answer to question Q1 is "yes" and the answer to question Q4 is "no" but the answer to question Q2 is unknown because the unit "q" does not have a value for a required feature. In this situation, "b|a_q" is mapped to any of the set of context-dependent units "{b.1,b.3}". Referring to FIG. 3C, the expansion of the phoneme arc labeled "b" is a parallel combination of a context-dependent arc labeled "b.1" and an arc labeled "b.3". In some alternative embodiments, such a parallel combination of arcs is represented by a single arc which is labeled according to the allowed variants, for example, as "b.1.3".

A similar situation occurs in determining the context-dependent variant of the unit "q" with a language boundary to the left of "q". For illustration, assume that "q|b_r" maps to multiple variants of "q", which are also represented as parallel arcs labeled with the different variants of the subword unit that are consistent with the context.

The two words from the different languages are linked at a single node, such that the first word can be represented by a sequence of subword units ending in any of the allowable context-dependent subword units, here "b.1" or "b.3" and the second word can be represented by a sequence of subword units beginning with any of the allowable context-dependent variants of the "q" subword unit. That is, all cross-word contexts that are not inconsistent with the common features of the two languages are allowed in an "or" combination.

In alternative embodiments, different types of combinations can be used. For example, rather than combining the context-dependent subword units in an "or" combination, statistical parameters of the combination can be used. For example, statistical parameters for a "b.1.3" context-dependent unit can be precomputed and used for the context-dependent unit at the language transition.

The approach to selecting the allowable context-dependent subword units can be expressed as follows. A context decision tree forms a mapping from the features of a subword unit and its contextual subword units to a leaf and its associated context-dependent subword unit. Because each node is associated with a logical question based on the features of the units, each leaf is associated with a Boolean expression (predicate) that, in general, depends on both language independent and language features. Note that in the case here of a decision tree in which the questions in are tests of equality of one feature of one contextual subword unit, each leaf is associated with particular values for a subset of the (language-independent and language dependent) features, and arbitrary values of the remaining features. For example, a leaf might be associated with the combination "voicing=true; tone=4". More generally, for example if complex questions can be asked at the nodes, or alternatively if a different form of mapping is used, each leaf and context-dependent subword unit is associated with a logical OR of such combinations of particular values for various subsets of features.

When unit "q" comes from a different language than "b", the approach assumes that values of the language independent features of "q" are known but that the values of the language-dependent (for the language of "b") features of "q" are unknown. The context-dependent subword units that are combined for "b" are those associated with the leaves of the tree for which the corresponding predicate is true for at least some value of the unknown language-dependent features of "q". For example, if unit "q" have has a feature "voicing=true", then this would match a leaf of the "b" decision tree that required "voicing=true; tone=4".

Figure 4:
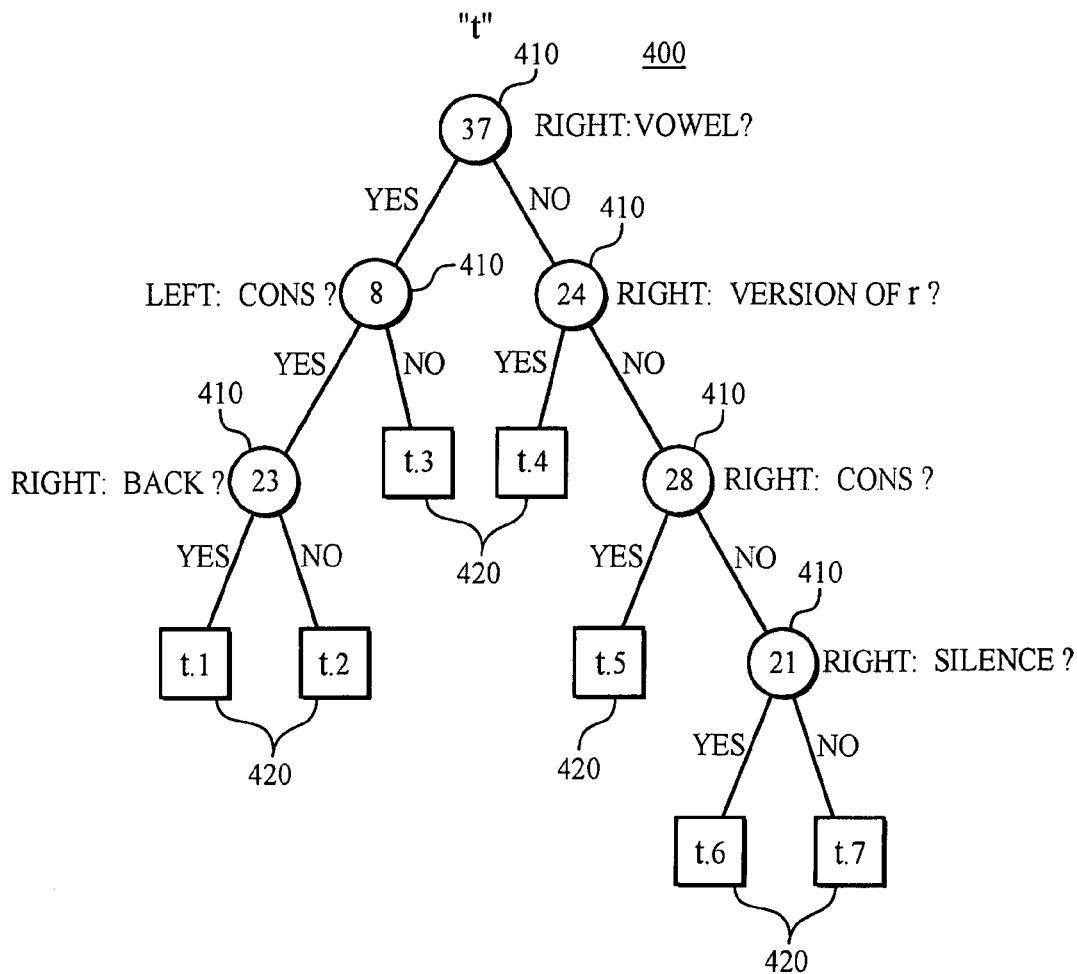
FIG. 4 is a context decision tree for an English "t"

Referring to FIG. 4, a context decision tree 400 for an English "t" includes a number of nodes 410, each associated with a question related to a single feature of the right contextual unit or the left contextual unit, and a number of leaves 420, each associated with a different context-dependent subword unit which is a variant of "t". In the illustration, each node is labeled with an integer which identifies the question asked at that node. At the root node, Q37 is asked: "does the right context have the feature vowel=T? (i.e., is the right phoneme a vowel)". If the answer is yes, the next question asked is Q8: "does the left context have feature consonant=T", and if the answer is no, the next question is Q24: "does the right context have feature version-of-r=T? (i.e., is the right context a version of an English r)". Note that "version-of-r" is a language-specific feature of English in this example. The overall tree is structured as shown in the figure, with seven leaves 420, labeled "t.1" through "t.7".

In an example, below, we consider the situation in which the left context is known to be "f" and the right context is unknown and comes from an unknown language. In this example, only the variant "t.3" is inconsistent with this context because the left context "f" does have the feature "consonant=T". For each of the remaining variants, the allowable combinations of language-independent features are shown. For example, "t.1" is associated with the combination of feature values of the right context {vowel=T, back=T}, "t.2" with {vowel=T,back=F}, "t.4" with {vowel=F}, "t.5" with {vowel=F,consonant=T}, "t.6" with {vowel=F,consonant=F, silence=T}, and "t.7" with {vowel=F,consonant=F, silence=F}. As will be seen below, a right context that has features {vowel=F, consonant=T, fricative=T} is consistent with "t.4" and "t.5" and is inconsistent with the other variants.

4 Dynamic Grammars

In U.S. application Ser. No. 09/906,390, an approach to processing a grammar to maintain cross-word context-dependent models at word transitions between a grammar and a dynamically-generated subgrammar is described. An issue that is addressed in that approach is that if one considers the last subword unit that makes a transition to a dynamically generated grammar, at the time that the main grammar is constructed, the possible first units of the dynamically generated grammar are as yet unknown, and therefore the right context is unknown. In general, the approach taken is that the context decision tree for the last unit is used to narrow down the possibilities that are consistent with the left context, leaving the selection among the remaining units until the right context from the dynamic grammar is known. A similar issue is addressed at the last unit of the dynamic grammar, and at the first unit of the dynamic grammar and the first unit in the main grammar following the dynamic grammar with respect to their left contexts.

In the multi-language situation, not only is the specific dynamic grammar not necessarily known at the time that the main grammar is constructed, the language of that dynamic grammar is also not known. Furthermore, at the time that the dynamic grammar is constructed, the language of the host main grammar is not necessarily known.

The general approach that is taken here is to process each of the grammars (main and dynamic) such that the point at which they can later be joined matches cross-word context based on the values of the language-independent features of the units at the boundary. Because the set of language-independent features are known at the time that both the grammars are constructed, the arcs at the edges can be labeled with the combinations of values of language-independent features that are appropriate for that arc.

Figure 5A:
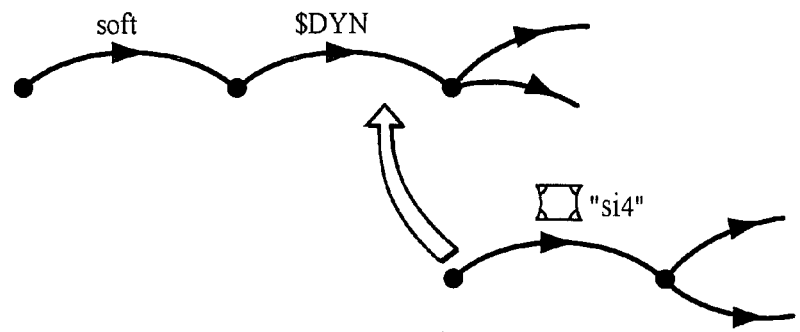
FIGS. 5A–5D illustrate dynamic combination of multi-language grammars in which a language transition can occur at the points of combination.
Figure 5B:
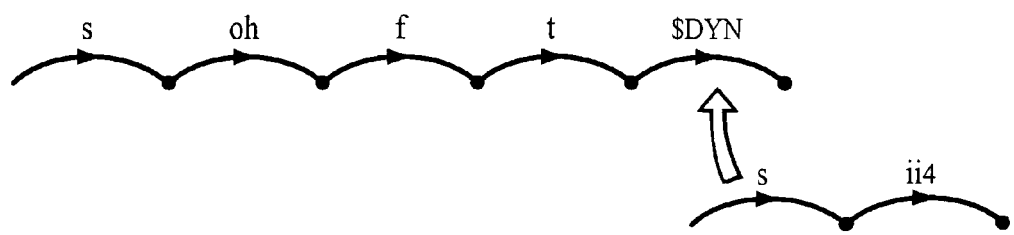

Referring to FIGS. 5A–5D, the approach for preprocessing grammars that can be dynamically joined is illustrated for the example where the English word "soft" is the last word before a dynamic portion, indicated by "$DYN", and the first word of the dynamic grammar is a Chinese word "si4", which is the translation of the English word "four". FIG. 5A illustrates a portion of the main grammar, as well as a portion of the "$DYN" grammar. FIG. 5B illustrates the expansion of the English word "soft" into arcs labeled with the (phonetic) subword units "s-ah-f-t" and the Chinese word "si4" into the sequence "s-ii4". Note that as will be discussed below, the same symbol, here "s" refers to different language specific subword units.

Figure 5C:
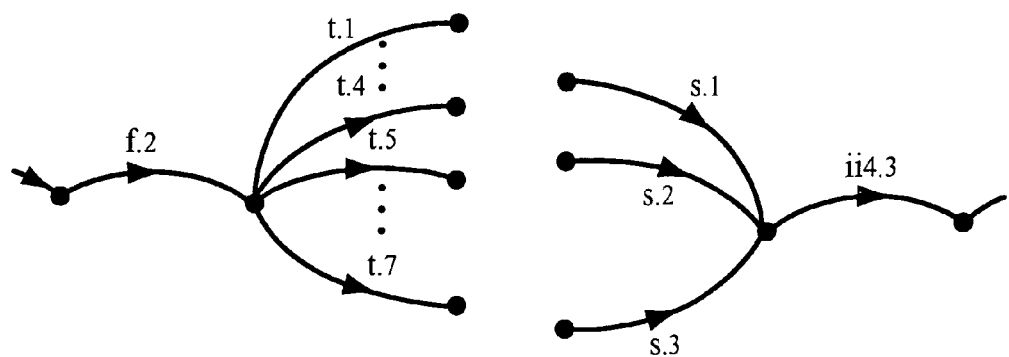

Referring to FIG. 5C, the expansion of the main grammar makes use of English context decision trees. For illustration the decision tree from "f" is used to determine that in the context "ah_t" that "f.2" is the appropriate context-dependent unit. Based on the decision tree for "t" shown in FIG. 4, context-dependent units that are consistent with the left context "f" and an unknown right context are "t.1", "t.2", "t.4", . . . "t.7". Similarly, the expansion of the Chinese "s" in the right context "ii4" and an unknown left context is assumed for illustration to be consistent with "s.1", "s.2", and "s.3".

In addition to identifying each of the possible context-dependent units at the edges, each of the possibilities, for example, "t.1", is labeled in the graph with the language-independent features of the English "t" and the language-independent features with which the right context must be consistent.

Figure 5D:
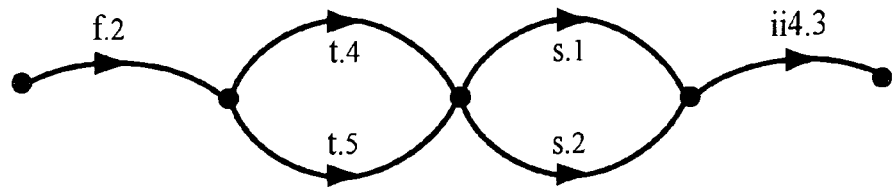

Referring to FIG. 5D, at runtime when the dynamic grammar is joined to the main grammar, the language-independent features of the Chinese "s" are matched to the labeled allowable language independent features of each of the context-dependent variants of "t". Based on the context decision tree shown in FIG. 4, the language independent features {consonant=T;fricative=T} of a Chinese "s" are inconsistent with the features of "t.1", "t.2", "t.6" and "t.7" and consistent with "t.4" and "t.5". For illustration, the language-independent features of the English "t" are assumed to be consistent with "s.1" and "s.2" but not "s.3". The dynamic assembly of the two grammars then connects the consistent arcs as shown in FIG. 5D, which has a similar structure to the graph shown in FIG. 3C for the statically determined cross-language context.

In general, each of the possible arcs at the edge of the main or dynamic grammar are associated with one of the leaves of the context decision tree for the edge subword unit. As discussed above, each leaf is associated with a predicate that must be satisfied by the language-independent features of the contextual subword units, which can be represented one combination, or more generally a logical OR of multiple combinations, of particular values of subsets of the features. In the case of the known left context "f" and unknown right context for "t", a leaf such as the one associated with the unit "t.1" is associated with a predicate that is a function of the language-independent features of the right context, which for the example illustrated in FIG. 4 is (vowel=T AND back=T). Because the values of the language-independent features are guaranteed to be known, these predicates can be evaluated at runtime when the main and dynamic grammars are combined to select the consistent context-dependent variants.

5 Finite-State Transducers (FSTs)

For a single-language system, an efficient implementation of the steps that transform grammar 110 to a context-dependent graph 150 suitable for use by a speech recognizer make use of Finite State Transducers (FSTs) and the composition operator that is used to combine FSTs. Details regarding the single-language approach are found in U.S. application Ser. No. 09/906,390 and U.S. application Ser. No. 09/906,575.

Using the FST approach, grammar 100 is represented as an FST G. Expansion according to a lexicon 122 is implemented as a composition of a lexicon FST L with G, represented as L∘G. Application of the phonological rules is implemented as a composition of a phonological rule FST P, represented as P∘L∘G.

Application of the context-dependent decision trees to the result of the previous stages is also implemented as a composition. In particular, the rules that are encoded in the decision trees are encoded in an FST C, which when composed with the product P∘L∘G yields C∘P∘L∘G which is the context-dependent graph 150 which is used by the speech recognizer.

In the multi-language case, the FSTs C, P, and L are constructed as in the single language case. To distinguish between the different languages, each of these FSTs is subscripted, for example, as $L_{EN-US}$, to indicate English as spoken in the United States, or $L_{ZH-ZH}$ to indicate Mandarin as spoken in China. In the approach described below, the identifiers of the subword units do not have to be unique across different languages.

Figure 6A:
FIGS. 6A–6C illustrate a phonetic expansion of multi-language grammar into a mixed unit phonetic graph using finite-state transducers (FSTs)

Referring to FIG. 6A, in order to mark the languages in grammar 110, labels on arc in the grammars that represent words include a suffix that indicates the language of that word and optionally the region in which that word is spoken. For example, from the word "soft" in US English is marked with a label "soft!EN-US". Similarly, the Chinese Mandarin word "si4" is marked with a suffix as "si4!ZH-ZH".

Figure 6B:
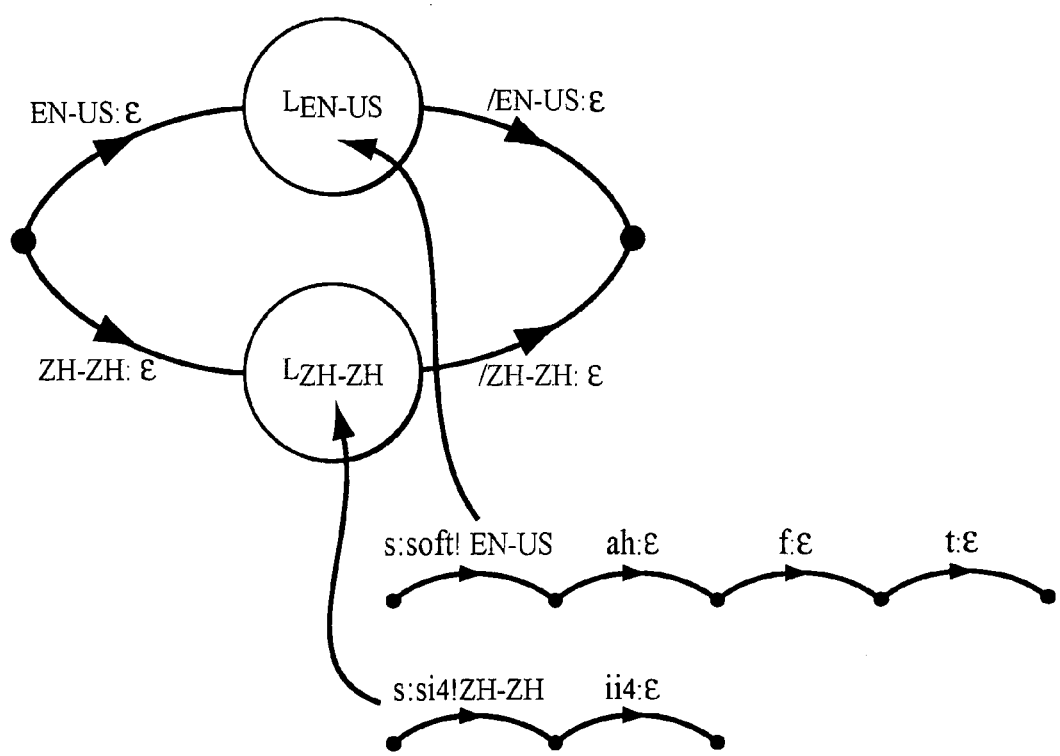

Referring to FIG. 6B, in order to perform the translation of the grammar into a phonemic graph, the lexicon FSTs $L_{EN-US}$ and $L_{ZH-ZH}$ are combined to form L. The arcs of $L_{EN-US}$ have inputs that are English phones and output that are null (epsilon) or English words. The combination forms a union of $L_{EN-US}$ and $L_{ZH-ZH}$ with the modification of the output labels to includes the language suffix (e.g., "!EN-US) and the modification that each English word is preceded by a language entry arc with a input label "EN-US" and an null output label and followed by a language exit arc with an input label "/EN-US" and a null output label. Similarly, each Chinese word is preceded by an arc with a "ZH-ZH" input label and followed by an arc with a "/ZH-ZH" input label.

Figure 6C:
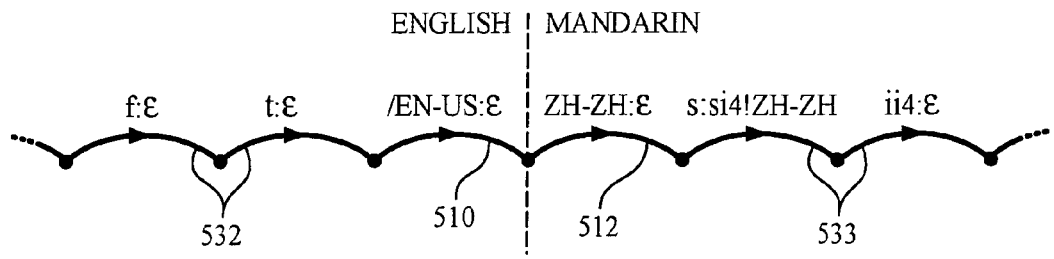

Note that the labels for subword units do not have to be unique across different languages because of the separation by the language exit and entry labels. Referring to FIG. 6C, the phonemic expansion of the word "soft" into arcs 532 labeled "s-ah-f-t" is separated from the expansion of the Chinese word "si4" into arcs 533 labeled "s-ii4" by exit arc 510 and entry arc 512. For example, as shown in FIG. 6C, the English phoneme "s" and the Chinese initial unit "s" share the same identifier, but are treated as distinct subword units.

As with the lexicon FSTs, the phonological rule FSTs $P_{EN-US}$ and $P_{ZH-ZH}$ are combined to form P. The combination forms a union, with the added requirement that application of the English phonological rule FST cannot cross the exit label for English, and therefore is not used applied to Chinese units. It is not necessary that every language have a phonological rules. Essentially, the phonological rule FST for such a language is treated as an identity under the composition operator.

Expansion to context-dependent units is at least conceptually performed in two phases. In the case of dynamic grammars, the first phase is precomputed while the second phase is performed dynamically on-demand when needed. In the case of static compilation, the two stages can both be precomputed. The first phase involves context-dependent expansion within each language. Then, in the second phase, cross-language context-dependent expansion is performed. Note that in the static compilation case, these two phases can be combined to form a single FST C that is composed with the phonetic graph to form the context-dependent graph.

Figure 7:
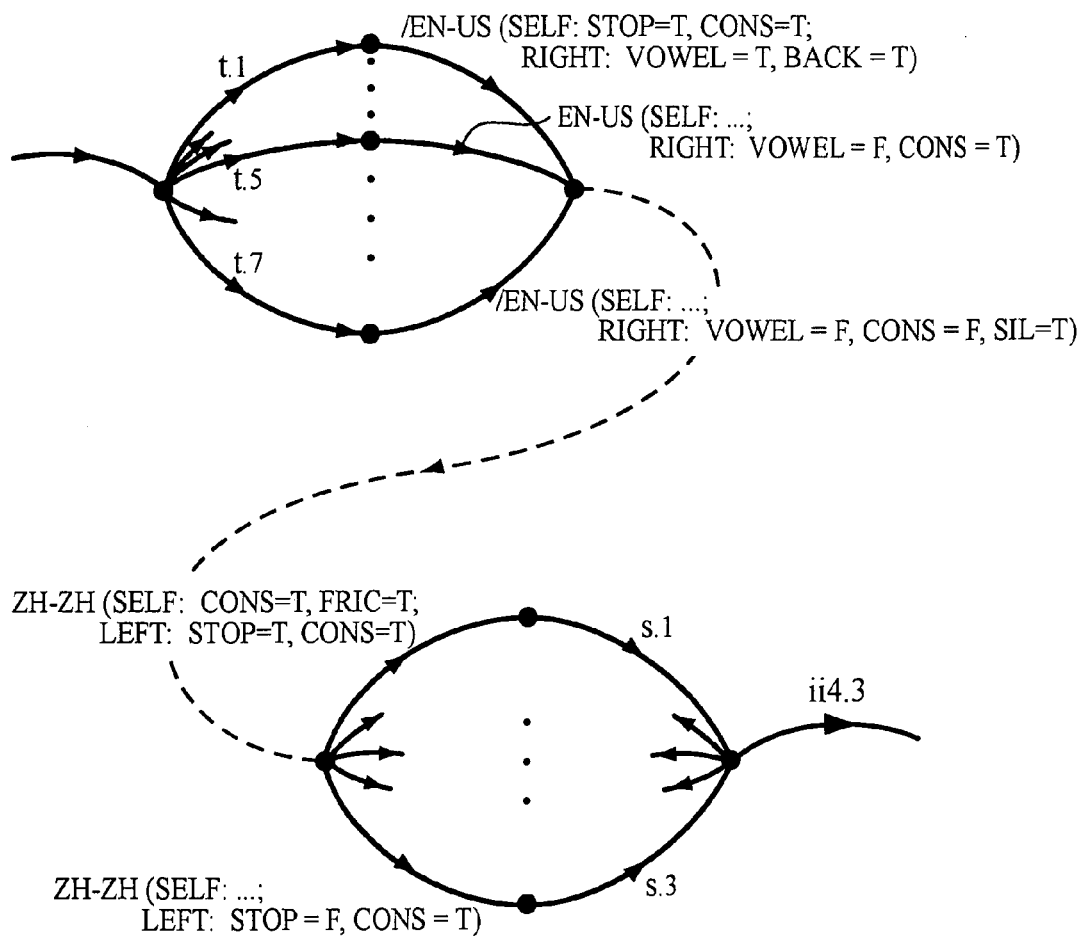
FIG. 7 is a portion of an context-dependent expansion prior to applying cross-language context.

In the first phase, context at a language boundary is treated as follows. Referring to FIG. 7, "t" in the left context "f" and in the right context of a language boundary "/EN-US" is expanded into a number of variants of "t" that are consistent with the context. As introduce above, these variants are "t.1", "t.2", "t.4", . . . "t.7". For each of the consistent variants, a sequence of two arcs are generated. The first is labeled with the context-dependent unit. The second arc is labeled with a language exit arc "/EN-US". This language exit arc is further labeled with the language independent features of the unit. In the case of the English "t", each of these language exit arcs are labeled with "self: consonant=T;stop=T" with the values of the other features taking on default values (e.g., false). Each of the language exit arcs is also labeled with the required features of the right context. For example, for the language exit arc associated with the "t.1" arc, the exit arc is also labeled with "right: vowel=T;back=T" with the other feature values being arbitrary. Similarly, for each variant of the Mandarin "s", the language entry arc "ZH-ZH" is labeled with "self: consonant=T;fricative=T" and with the appropriate features for the left context. For example, the entry arc associated with "s.1" is labeled with "left: consonant=T;stop=T" while the arc associated with "s.3" is labeled with "left: consonant=T;stop=F".

In the second phase, only particular sequences of language exit arcs and language entry arcs are allowed based on their "self", "right" and "left" labelings. In this example, because the Chinese "s" has language-independent feature "self: consonant=T;fricative=T" and implicitly "vowel=F" the content-dependent unit "t.4" is retained because it only requires that "vowel=F" is satisfied. Similarly, "t.5" is retained because "vowel=F;consonant=T" is satisfied. The other variants of "t" are not retained because there is no allowable path linking their associated language exit arc with any of the language entry arcs. For illustration, assume that variants "s.1" and "s.2" of the Chinese "s" are retained based on a similar procedure. The result is then as shown in FIG. 5D. Note that the exit and entry labels are optionally retained, thereby allowing speech recognizer 160 to determine which acoustic models to apply to each of the identified context-dependent units because these labels are not necessarily unique across languages.

Construction of the combined FST C from the individual language-dependent FSTs $C_{EN-US}$ and $C_{ZH-ZH}$ is as follows. First, each of the language FSTs is modified to perform the expansion in the first phase. Note that these expansions do not require knowledge of the neighboring language because the labeling of the language exit and entry arc is in terms of language independent features. A union of these FSTs is then formed. An FST that implements the second phase is constructed by allowing language transitions in which any language exit arc of the form "/LANG1(self: . . . ; right: . . . )" is allowed to be followed by a language entry arc of the form "LANG2(self: . . . ; left: . . . )" only if the "self" feature values of each arc are consistent with the "right" or "left" features.

6 Alternatives

The approach described above is in the context of combination of separately trained speech recognition models for different languages that are combined for recognition. The approach is applicable to other situations in which different sets of subword units are used to train different acoustic models. For example, different subword units can be used to train different vocabularies for a single language. An example of such a situation is training of phonetic models for English, and later training a recognizer that is tuned to digit strings using word-dependent subword units. Cross-word context modeling between phonetically-represented words and digits represented by word-dependent features can then use the "language"-independent features to determine appropriate cross-word context models. This is the case even if the phonetic training did not anticipate the use of the digit models.

Another situation in which the approach can be used is in which different languages may share the same basic units, but these units may be marked with language-dependent diacritics. The cross-word modeling can then be based on the units, ignoring the diacritics.

Another alternative is to consider the specific features that are in common to two languages at a cross-language boundary. For example, rather than using only the language-independent features that are guaranteed to be known for all languages, the specific intersection of features for the two languages involved can be used.

For each language, it is not necessary that decision trees are used to map from a subword unit and its context to a particular context-dependent unit. Other deterministics (or even probabilistic) functions can be used. When language dependent features of a contextual unit are not available, the set of possibilities can be generated to include all consistent subword units.

The description above focuses on selection of context-dependent units. Other approaches that us context to select other statistical parameters for subword units, such as the select probability distributions for particular parts (e.g., states) of a subword unit can use this approach. Rather than using the approach to select an entire context-dependent subword unit, the approach is used to select the parameters for a particular part of the unit.

It is to be understood that the foregoing description is intended to illustrate and not to limit the scope of the invention, which is defined by the scope of the appended claims. Other embodiments are within the scope of the following claims.

What is claimed is:

1. A method for selecting context-dependent units for speech recognition comprising:
   accepting a representation of the first word from a first language in terms of subword units from a first set of subword units that is associated with the first language, including accepting a first subword unit of the first word which is adjacent to the second word from a second language according to a speech recognition grammar;
   determining a common set of features that characterize subword units in both the first set of subword units and in a second set of subword units that is associated with the second language; and
   selecting one or more first context-dependent units corresponding to the first subword unit according to features in the common set of features of a second subword unit of the second word which is adjacent to the first word according to the grammar.

2. The method of claim 1 wherein the first set of subword units includes phonetic subword units.

3. The method of claim 2 wherein the first language includes English.

4. The method of claim 1 wherein the first word precedes the second word in the speech recognition grammar.

5. The method of claim 1 wherein the first word follows the second word in the speech recognition grammar.

6. The method of claim 1 wherein selecting one or more first context-dependent units corresponding to the first subword unit includes selecting only a single context dependent unit.

7. The method of claim 1 wherein the second word is a specific word in the second language, and selecting the one or more context-dependent units includes selecting said units according to a specific subword unit of the specific word which is adjacent to the first word according to the speech recognition grammar.

8. The method of claim 1 further comprising:
   selecting one or more second context-dependent units associated with the second subword unit according to features in the common set of features of a first subword unit of the first word which is adjacent to the first word according to the speech recognition grammar.

9. The method of claim 8 further comprising linking the selected one or more first context-dependent units to the selected one or more second context dependent units to form a context-dependent grammar.

10. The method of claim 1 wherein the second word is an unspecified word in the second language, and selecting the one or more context-dependent units includes selecting said units according to multiple possible second words of the second language.

11. The method of claim 10 further comprising forming a grammar enabling runtime linking of the selected one or more first context-dependent units with a later-determined second subword unit.

12. The method of claim 11 further comprising determining an identity of the second subword unit after forming the grammar enabling runtime linking.

13. The method of claim 12 further comprising selecting a subset of the one or more of the first context-dependent units at runtime based on the determined identity of the second subword unit.

14. The method of claim 12 further comprising:
   selecting one or more second context-dependent units associated with the second subword unit according to features in the common set of features of a first subword unit of the first word which is adjacent to the first word according to the grammar.

15. The method of claim 14 further comprising linking the selected one or more first context-dependent units to the selected one or more second context dependent units to form a context-dependent grammar.

16. The method of claim 1 further comprising accepting first statistical data for selecting context-dependent units associated with the first set of subword units according to context of said units, and selecting the one or more context-dependent units includes using the accepted statistical data.

17. The method of claim 16 further comprising computing said first statistical data using only training data from the first language.

18. The method of claim 16 wherein said first statistical data is based only on training data from the first language.

19. The method of claim 16 wherein the first statistical data enables selection of a unique context-dependent subword unit associated with a subword unit and a context of subword units all from the first set of subword units associated with the first language.

20. The method of claim 16 wherein selecting the one or more first context-dependent units associated with the first subword unit includes selecting said units that are not inconsistent with a context of subword units that includes subword units from both the first and the second set of subword units.

21. The method claim 16 wherein accepting the statistical data includes accepting one or more decision trees.

22. The method of claim 21 wherein selecting the one or more first context-dependent units associated with the first subword unit includes using a decision tree to identify one or more leaves of said tree associated with said context-dependent units.

23. The method of claim 22 wherein using the decision tree includes selecting branches of the tree according to features of the second subword unit in the common set of features.

24. The method of claim 23 wherein using the decision tree includes selecting branches of the tree without consideration of features of the second subword unit not in the common set of features.

25. Software stored on computer readable media comprising instructions for causing a computer to perform functions comprising:
   accepting a representation of the first word from a first language in terms of subword units from a first set of subword units that is associated with the first language, including accepting a first subword unit of the first word which is adjacent to the second word from a second language according to a speech recognition grammar;
   determining a common set of features that characterize subword units in both the first set of subword units and in a second set of subword units that is associated with the second language; and selecting one or more first context-dependent units corresponding to the first subword unit according to features in the common set of features of a second subword unit of the second word which is adjacent to the first word according to the grammar.

26. A method for selecting context-dependent units for speech recognition comprising:

accepting a specification of sequences of subword units associated with a speech recognition grammar, including accepting a specification of at least one sequence of a first subword unit from a first language and a second subword unit from a second language;

determining values for the first and the second subword unit for each of a common set of features of subword units that are common to both the first and the second language; and selecting a context-dependent variant of the first subword unit according to the values of features of the second subword unit that are in the common set of features.

* * * * *